US010153480B2

(12) United States Patent
Lim et al.

(10) Patent No.: US 10,153,480 B2
(45) Date of Patent: *Dec. 11, 2018

(54) ELECTRODE FOR SECONDARY BATTERY AND SECONDARY BATTERY INCLUDING THE SAME

(71) Applicant: LG Chem, Ltd., Seoul (KR)

(72) Inventors: Soo Hyun Lim, Daejeon (KR); Min Hee Lee, Gyeonggi-do (KR); Youn Kyoung Lee, Seoul (KR); Daehong Kim, Daejeon (KR); Jae Hyun Lee, Daejeon (KR); Tae Jin Park, Daejeon (KR)

(73) Assignee: LG Chem, Ltd. (KR)

( * ) Notice: Subject to any disclaimer, the term of this patent is extended or adjusted under 35 U.S.C. 154(b) by 115 days.

This patent is subject to a terminal disclaimer.

(21) Appl. No.: 15/266,428

(22) Filed: Sep. 15, 2016

(65) Prior Publication Data
US 2017/0005323 A1 Jan. 5, 2017

Related U.S. Application Data

(63) Continuation of application No. 14/485,913, filed on Sep. 15, 2014, now Pat. No. 9,508,993, which is a continuation of application No. PCT/KR2013/003311, filed on Apr. 18, 2013.

(30) Foreign Application Priority Data

Apr. 18, 2012 (KR) .......................... 10-2012-0040163
Apr. 19, 2012 (KR) .......................... 10-2012-0040988

(51) Int. Cl.
H01M 4/131 (2010.01)
H01M 4/62 (2006.01)
H01M 4/485 (2010.01)
H01M 4/505 (2010.01)
H01M 4/525 (2010.01)
H01M 4/66 (2006.01)
H01M 10/0525 (2010.01)

(52) U.S. Cl.
CPC ........... H01M 4/131 (2013.01); H01M 4/485 (2013.01); H01M 4/505 (2013.01); H01M 4/525 (2013.01); H01M 4/623 (2013.01); H01M 4/624 (2013.01); H01M 4/625 (2013.01); H01M 4/661 (2013.01); H01M 10/0525 (2013.01); H01M 2220/20 (2013.01); Y02E 60/122 (2013.01); Y02T 10/7011 (2013.01)

(58) Field of Classification Search
CPC ...... H01M 4/625; H01M 4/131; H01M 4/485; H01M 4/505; H01M 4/525; H01M 4/623; H01M 4/624; H01M 4/661; H01M 10/0525; H01M 2220/20; Y02E 60/122; Y02T 10/7011
See application file for complete search history.

(56) References Cited

U.S. PATENT DOCUMENTS

| 9,508,993 B2* | 11/2016 | Lim ..................... H01M 4/625 |
|---|---|---|
| 2006/0046155 A1 | 3/2006 | Inagaki et al. |
| 2010/0003590 A1 | 1/2010 | Park et al. |
| 2010/0015524 A1 | 1/2010 | Kim et al. |
| 2010/0261069 A1 | 10/2010 | Nakura |
| 2011/0274962 A1 | 11/2011 | Inagaki et al. |
| 2011/0311872 A1 | 12/2011 | Oh et al. |
| 2012/0027929 A1 | 2/2012 | Huang et al. |
| 2012/0058379 A1 | 3/2012 | Kishi et al. |
| 2012/0244334 A1 | 9/2012 | Park et al. |
| 2013/0008217 A1 | 1/2013 | Hosoe et al. |
| 2013/0040196 A1 | 2/2013 | Hosoe et al. |
| 2013/0065129 A1 | 3/2013 | Song et al. |
| 2013/0122373 A1 | 5/2013 | Tamura et al. |
| 2014/0199584 A1 | 7/2014 | Kondo et al. |

FOREIGN PATENT DOCUMENTS

| CN | 101192682 A | 6/2008 |
|---|---|---|
| EP | 2437337 A1 | 4/2012 |
| JP | H-10247496 A | 9/1998 |
| JP | H-11283629 A | 10/1999 |
| JP | 2000-156229 A | 6/2000 |
| JP | 2000340255 A | 12/2000 |
| JP | 2001-210324 | 8/2001 |
| JP | 2006066341 A | 3/2006 |
| JP | 2007294164 A | 11/2007 |
| JP | 2008059980 A | 3/2008 |
| JP | 2009-505929 A | 2/2009 |
| JP | 2009076468 A | 4/2009 |
| JP | 2009146822 A | 7/2009 |
| JP | 2010-153258 A | 7/2010 |
| JP | 2010170799 A | 8/2010 |
| JP | 2011081931 A | 4/2011 |
| JP | 2011100616 A | 5/2011 |
| JP | 2012014993 A | 1/2012 |
| JP | 2012033279 A | 2/2012 |
| JP | 2012059457 A | 3/2012 |
| JP | 2012129095 A | 7/2012 |
| JP | 2012256582 A | 12/2012 |
| JP | 2012256583 A | 12/2012 |
| JP | 2012256584 A | 12/2012 |
| JP | 2013-098034 A | 5/2013 |
| KR | 20070106821 A | 11/2007 |

(Continued)

OTHER PUBLICATIONS

International Search Report for Application No. PCT/KR2013/003311 dated Jul. 18, 2013.

Primary Examiner — Laura Weiner
(74) Attorney, Agent, or Firm — Lerner, David, Littenberg, Kurmholz & Mentlik, LLP

(57) ABSTRACT

Disclosed is an electrode for secondary batteries including an electrode mixture including an electrode active material, binder and conductive material coated on a current collector. The present invention provides an electrode for secondary batteries wherein an electrode active material is a cathode active material and/or anode active material, and the conductive material is included in an amount of 0.1 to 15% based on total weight of the electrode mixture, and a secondary battery including the same.

12 Claims, 1 Drawing Sheet

(56) References Cited

FOREIGN PATENT DOCUMENTS

| | | | |
|---|---|---|---|
| KR | 20090012134 | A | 2/2009 |
| KR | 20110097718 | A | 8/2011 |
| KR | 101103606 | B1 | 1/2012 |
| KR | 101120437 | B1 | 3/2012 |
| WO | 2013-084840 | A1 | 6/2013 |
| WO | 2013145109 | A1 | 10/2013 |

* cited by examiner

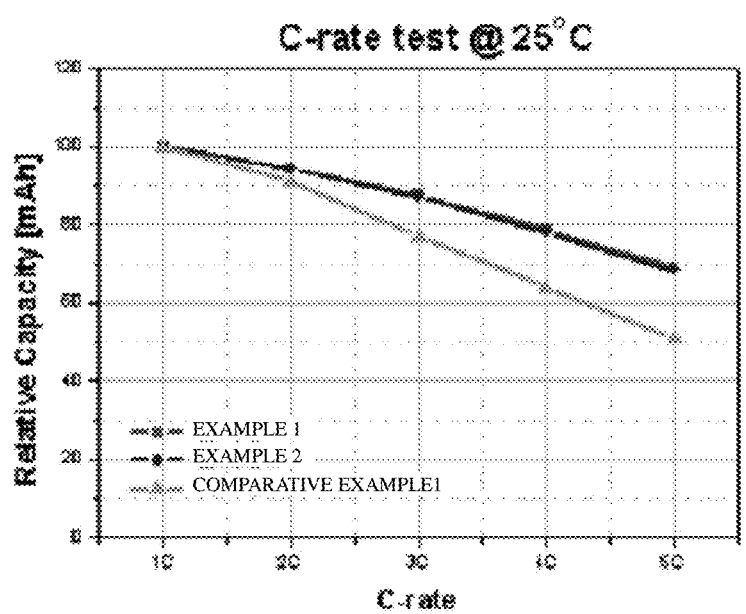

ELECTRODE FOR SECONDARY BATTERY AND SECONDARY BATTERY INCLUDING THE SAME

CROSS-REFERENCE TO RELATED APPLICATIONS

The present application is a continuation of U.S. application Ser. No. 14/485,913, filed on Sep. 15, 2014, now U.S. Pat. No. 9,508,993 which is a continuation of International Application No. PCT/KR2013/003311, filed on Apr. 18, 2013, which claims priority from Korean Patent Application No. 10-2012-0040163, filed on Apr. 18, 2012 and Korean Patent Application No. 10-2012-0040988 filed on Apr. 19, 2012, in the Korean Intellectual Property Office, the disclosures thereof are incorporated herein by reference.

TECHNICAL FIELD

The present invention relates to an electrode for secondary batteries including an electrode mixture including an electrode active material, binder and conductive material coated on a current collector wherein the electrode active material is a cathode active material and/or anode active material, the cathode active material includes an oxide represented by Formula 1 below, the anode active material includes an oxide represented by Formula 2 below, and the conductive material is included in an amount of 0.1 to 15% based on total weight of the electrode mixture:

$$Li_xM_yMn_{2-y}O_{4-z}A_z \quad (1)$$

wherein $0.9 \leq x \leq 1.2$, $0 < y < 2$ and $0 \leq z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one monovalent or divalent anion, $$Li_aM'_bO_{4-c}A_c \quad (2)$$

wherein M' is at least one element selected from the group consisting of Ti, Sn, Cu, Pb, Sb, Zn, Fe, In, Al and Zr; $0.1 \leq a \leq 4$ and $0.2 \leq b \leq 4$ in which a and b are determined according to oxidation number of M'; $0 \leq c < 0.2$ in which c is determined according to oxidation number of A; and A is at least one monovalent or divalent anion.

BACKGROUND ART

As energy source prices are increasing due to depletion of fossil fuels and interest in environmental pollution is escalating, demand for environmentally-friendly alternative energy sources is bound to play an increasing role in future. Thus, research into various power generation techniques such as nuclear energy, solar energy, wind energy, tidal power, and the like, is underway, and power storage devices for more efficient use of the generated energy are also drawing much attention.

In particular, demand for lithium secondary batteries is rapidly increasing as mobile device technology continues to develop and demand therefor continues to increase. Recently, lithium secondary batteries as a power source of electric vehicles (EVs) and hybrid electric vehicles (HEVs) are used and the market for lithium secondary batteries continues to expand to applications such as auxiliary power supplies through smart-grid technology.

Generally, lithium secondary batteries have a structure in which an electrode assembly, which is impregnated with a lithium electrolyte, including a cathode including a lithium transition metal oxide as an electrode active material, an anode including a carbon-based active material, and a porous separator. A cathode is manufactured by coating a cathode mixture including a lithium transition metal oxide on an Al foil. An anode is manufactured by coating an anode mixture including a carbon-based active material on a Cu foil.

To improve electrical conductivity, a conductive material is added to a cathode mixture and anode mixture. In particular, a lithium transition metal oxide used as a cathode active material has low electrical conductivity and thereby, a conductive material must be added to a cathode mixture. Among conductive materials, conventional conductive materials used in order to improve conductivity of a cathode mixture have a drawback that loading density could not be enlarged at a compression process reducing thickness of a cathode mixture.

Therefore, the need for new technologies which improve performance of secondary batteries by using new conductive materials which may substitute for conventionally used carbon black, graphite and the like is very high.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when an electrode for secondary batteries coated with an electrode mixture including certain amounts of a predetermined electrode active material and conductive material is used, desired effects may be achieved, thus completing the present invention.

Technical Solution

In accordance with one aspect of the present invention, provided is an electrode for secondary batteries including an electrode mixture including an electrode active material, binder and conductive material coated on a current collector wherein the electrode active material is a cathode active material and/or anode active material, the cathode active material includes an oxide represented by Formula 1 below, the anode active material includes an oxide represented by Formula 2 below, and the conductive material is included in an amount of 0.1 to 15% based on total weight of the electrode mixture:

$$Li_xM_yMn_{2-y}O_{4-z}A_z \quad (1)$$

wherein $0.9 \leq x \leq 1.2$, $0 < y < 2$, and $0 \leq z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one monovalent or divalent anion, $$Li_aM'_bO_{4-c}A_c \quad (2)$$

wherein M' is at least one element selected from the group consisting of Ti, Sn, Cu, Pb, Sb, Zn, Fe, In, Al and Zr; $0.1 \leq a \leq 4$ and $0.2 \leq b \leq 4$ in which a and b are determined according to oxidation number of M'; $0 \leq c < 0.2$ in which c is determined according to oxidation number of A; and A is at least one monovalent or divalent anion.

Generally, the conductive material may be included in an amount of 1 to 50 wt % based on total weight of an electrode mixture and for more preferable electrical conductivity improvement, the conductive material may be included in an amount of 15 to 25 wt % based on total weight of an electrode mixture.

Therefore, the present inventors confirmed that, using a predetermined material having very high electrical conductivity as a conductive material, even when the material is included in an amount of a ratio of 0.1 to 15% in a cathode mixture, electrical conductivity is improved and even when a relatively small amount of a conductive material is added to a cathode mixture, superior output is exhibited.

The predetermined material may be a carbon nanotube (CNT) or graphene. As a conductive material, these materials may be included in an amount of 1 to 10%, particularly 5 to 10%, based on total weight of the electrode mixture. When an amount of the conductive material is too small, electrical conductivity is rarely improved. Whereas, when an amount of the conductive material is too large, a relative amount of an electrode active material is reduced and thereby, capacities of batteries may be reduced.

The carbon nanotube is not limited so long as it is known in the art and may be, a carbon nanotube having particularly an average diameter of 5 to 50 nm and a length of 0.5 to 10 μm, more particularly an average diameter of 5 to 20 nm and a length of 0.5 to 5 μm.

The oxide of the above Formula 1 as a cathode active material may be presented by Formula 3 below:

$$Li_xNi_yMn_{2-y}O_4 \quad (3)$$

wherein 0.9≤x≤1.2, and 0.4≤y≤0.5.

More particularly, the oxide of Formula 3 may be $LiNi_{0.5}Mn_{1.5}O_4$ or $LiNi_{0.4}Mn_{1.6}O_4$. The oxide of Formula 1 may have an average diameter (D50) of 5 to 30 μm, particularly 8 to 20 μm.

An average diameter of the oxide of the present invention, in detail, means a diameter of a mixture in which plural particles are agglomerated with one another. Each oxide unit of cathode active materials agglomerates with one another according to setting conditions during manufacturing processes to form one mixture. The agglomerated mixture exhibits preferable active material characteristics. Therefore, the average diameter of the oxide means, in detail, a diameter of an agglomerated mixture as described above.

The oxide of Formula 2 as an anode active material may be an oxide represented by Formula 2 below:

$$Li_aTi_bO_4 \quad (4)$$

wherein 0.1≤a≤4 and 0.2≤b≤4.

More particularly, the oxide of Formula 4 may be $Li_{1.33}Ti_{1.67}O_4$ or $LiTi_2O_4$.

Due to high electric potentials of such lithium titanium oxides, spinel lithium manganese composite oxides of $LiNi_xMn_{2-x}O_4$ where x=0.01 to 0.6, having a relatively high electric potential may be used as a cathode active material.

The present invention further provides a secondary battery including the electrode for secondary batteries.

The secondary battery according to the present invention includes a cathode manufactured by drying and pressing after coating a mixture of a cathode active material, conductive material and binder on a cathode current collector and an anode manufactured by the method. A filler may further be added to the mixture.

The cathode current collector is generally fabricated to a thickness of 3 to 500 μm. The cathode current collector is not particularly limited so long as it does not cause chemical changes in the fabricated secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The cathode active material may be materials defined above and additionally may be, for example, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where 0≤x≤0.33, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides of Formula $LiNi_{1-x}M_xO_2$ where M=Co, Mn, Al, Cu, Fe, Mg, B, or Ga, and 0.01≤x≤0.3; lithium manganese composite oxides of Formula $LiMn_{2-x}M_xO_2$ where M=Co, Ni, Fe, Cr, Zn, or Ta, and 0.01≤x≤0.1), or Formula $Li_2Mn_3MO_8$ where M=Fe, Co, Ni, Cu, or Zn; $LiMn_2O_4$ in which some of the Li atoms are substituted with alkaline earth metal ions; disulfide compounds; $Fe_2(MoO_4)_3$; and the like.

The conductive material may further include carbon nanotubes or new graphene materials referred to above. Such a material may be added to 1 to 20 wt % based on the weight of a cathode mixture including a cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between the electrode active material and the conductive material and in binding of the electrode active material to the electrode current collector. The binder is typically added in an amount of 1 to 50 wt % based on the total weight of the mixture including the cathode active material. Examples of the binder include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

An anode current collector is typically fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material. In addition, the anode current collector may be used in various forms including films, sheets, foils, nets, porous structures, foams, and non-woven fabrics.

The anode active material may be materials defined above and additionally, for example, may be carbon such as hard carbon and graphite-based carbon; metal composite oxides such as $Li_xFe_2O_3$ where $0 \leq x \leq 1$, $Li_xWO_2$ where $0 \leq x \leq 1$, and $Sn_xMe_{1-x}Me'_yO_z$ where Me: Mn, Fe, Pb or Ge; Me': Al, B, P, Si, Group I, Group II and Group III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li-Co-Ni based materials; and the like.

The secondary battery may have a structure in which an electrode assembly, which includes a cathode, an anode, and a separator disposed between the cathode and the anode, is impregnated with the electrolyte including a lithium salt.

The separator is disposed between the cathode and the anode and, as the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing electrolyte consists of an electrolyte and lithium salt. As the electrolyte, a non-aqueous organic solvent, organic solid electrolyte, inorganic solid electrolyte and the like may be utilized, but the present invention is not limited thereto.

The non-aqueous organic solvent may be, for example, be an aprotic organic solvent such as N-methyl-2-pyrrolidinone, propylene carbonate, ethylene carbonate, butylene carbonate, dimethyl carbonate, diethyl carbonate, gamma butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$-LiI-LiOH, $LiSiO_4$, $LiSiO_4$-LiI-LiOH, $Li_2SiS_3$, $Li_4SiO_4$, $Li_4SiO_4$-LiI-LiOH, and $Li_3PO_4$-$Li_2S$-$SiS_2$.

The lithium salt is a material that is readily soluble in the non-aqueous electrolyte and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, imides, and the like.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

In one embodiment, the lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent including EC or PC, which is a high dielectric solvent and a cyclic carbonate, and DEC, DMC, or EMC, which is a low viscosity solvent and a linear carbonate.

The present invention also provides a battery module including the lithium secondary battery as a unit cell and a battery pack including the battery module.

The battery pack may be used as a power source for medium and large devices that require stability at high temperature, long cycle life, and high rate characteristics.

Examples of such medium and large devices include, but are not limited to, electric electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

BRIEF DESCRIPTION OF DRAWINGS

The above and other objects, features and other advantages of the present invention will be more clearly understood from the following detailed description taken in conjunction with the accompanying drawing, in which:

FIG. 1 is a graph comparing relative capacities of batteries according to C-rate of Experimental Example 1.

MODE FOR INVENTION

Now, the present invention will be described in more detail with reference to the following examples. These examples are provided only for illustration of the present invention and should not be construed as limiting the scope and spirit of the present invention.

Example 1

90 wt % of $LiNi_{0.5}Mn_{1.5}O_4$ as a cathode active material, 5 wt % of carbon nanotubes having an average diameter of 10 nm and a length of 1 μ as a conductive material and 5 wt % of PVdF as a binder were added to NMP to manufacture a cathode mixture. Such a cathode mixture was coated, dried and compressed on an Al current collector to manufacture a cathode for a secondary battery.

Example 2

A cathode for a secondary battery was manufactured in the same manner as in Example 1, except that 85 wt % of LiNi$_{0.5}$Mn$_{1.5}$O$_4$ as a cathode active material, 10 wt % of carbon nanotubes having an average diameter of 10 nm and a length of 1 μm as a conductive material and 5 wt % of PVdF as a binder were used.

Comparative Example 1

A cathode for a secondary battery was manufactured in the same manner as in Example 2, except that Super-P instead of carbon nanotube as a conductive material was used to manufacture a cathode mixture.

Experimental Example 1

90 wt %, of Li$_{1.33}$Ti$_{1.67}$O$_4$, 5 wt % of Super-C as a conductive material and 5 wt % of PVdF as a binder were added to NMP so as to manufacture an anode mixture. Thereafter, the anode mixture was coated, dried and compressed on an Al current collector to manufacture an anode. Using the cathodes manufactured in Examples 1 and 2, and Comparative Example 1, the above anode and a porous separator made of polypropylene, an electrode assembly was manufactured. Thereafter, after inserting the electrode assembly into a pouch and connecting lead wires, a mixture solution of ethylene carbonate (EC), dimethyl carbonate (DMC), ethyl methyl carbonate (EMC) mixed in a volume ratio of 1:1:1, which is dissolved in 1 M LiPF$_6$ salt, was added to an electrolyte and then sealed so as to assemble a lithium secondary battery. A relative capacity reduction rate according to the C-rate level of such a secondary battery was measured. Results are shown in FIG. 1 below.

Referring to FIG. 1 below, with increasing the level of C-rate, the batteries of Examples 1 and 2 have a relatively small capacity reduction rate, compared to the battery of Comparative Example 1

Those skilled in the art will appreciate that various modifications, additions and substitutions are possible, without departing from the scope and spirit of the invention based on the above contents.

INDUSTRIAL APPLICABILITY

As described above, the electrode for the secondary battery according to the present invention may improve electrical conductivity using a small amount of a predetermined conductive material, which is used in an amount of 0.1 to 15% based on total weight of the electrode mixture, and thereby a capacity reduction rate is relatively small with increasing C-rate. As a result, the secondary battery including the electrode exhibits a superior output characteristic and charge rate.

The invention claimed is:

1. A cathode for a secondary battery comprising a cathode mixture comprising a cathode active material, a binder and a conductive material coated on a current collector,
   wherein the cathode active material includes an oxide represented by Formula 3 below, and
   the conductive material is a carbon nanotube (CNT) having an average diameter of 5 to 50 nm and a length of 0.5 to 10 μm and the conductive material is included in an amount of 0.1 to 15% based on total weight of the cathode mixture, $$Li_xNi_yMn_{2-y}O_4 \qquad (3)$$

wherein 0.9<x<1.2 and 0.4<y<0.5.

2. The cathode according to claim 1, wherein the oxide is LiNi$_{0.5}$Mn$_{1.5}$O$_4$ or LiNi$_{0.4}$Mn$_{1.6}$O$_4$.

3. A secondary battery comprising the cathode according to claim 1.

4. The secondary battery according to claim 3, wherein the secondary battery is a lithium secondary battery.

5. A battery module comprising the secondary battery according to claim 4 as a unit battery.

6. A battery pack comprising the battery module according to claim 5.

7. A device comprising the battery pack according to claim 6.

8. The device according to claim 7, wherein the device is an electric vehicle, a hybrid electric vehicle, a plug-in hybrid electric vehicle, or a system for storing power.

9. The secondary battery according to claim 3, further comprising an anode comprising an anode mixture comprising an anode active material, a binder and a conductive material coated on a current collector, wherein the anode active material includes an oxide represented by Formula 4 below:

$$Li_aTi_bO_4 \qquad (4)$$

wherein 0.1<a<4 and 0.2<b<4.

10. The secondary battery according to claim 9, wherein the oxide of Formula 4 is Li$_{1.33}$Ti$_{1.67}$O$_4$ or LiTi$_2$O$_4$.

11. The cathode according to claim 1, wherein the conductive material is included in an amount of 1 to 10% based on total weight of the cathode mixture.

12. The cathode according to claim 1, wherein the conductive material is included in an amount of 5 to 10% based on total weight of the cathode mixture.

* * * * *